US012786866B1

(12) United States Patent
Shukla et al.

(10) Patent No.: US 12,786,866 B1
(45) Date of Patent: Nov. 3, 2026

(54) IDENTIFYING SSIDs ASSOCIATED WITH CAPTIVE PORTALS

(71) Applicant: Amazon Technologies, Inc., Seattle, WA (US)

(72) Inventors: Ashish Kumar Shukla, Milpitas, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 519 days.

(21) Appl. No.: 18/081,244

(22) Filed: Dec. 14, 2022

(51) Int. Cl.
*H04W 48/20* (2009.01)

(52) U.S. Cl.
CPC .................................. *H04W 48/20* (2013.01)

(58) Field of Classification Search
None
See application file for complete search history.

(56) References Cited

U.S. PATENT DOCUMENTS 8,479,263 B1 * 7/2013 Liu .................... H04L 63/0869 726/3
10,454,897 B1 * 10/2019 Rajanna .............. H04L 63/0281
10,601,832 B1 * 3/2020 Pajjuri .................... H04L 63/10
11,671,904 B1 * 6/2023 Wei ......................... H04L 67/02 370/254
2008/0186882 A1 * 8/2008 Scherzer ............... H04W 72/04 370/310
2008/0293404 A1 * 11/2008 Scherzer ............... H04W 84/18 455/426.1
2009/0124284 A1 * 5/2009 Scherzer ........... H04M 1/72445 455/552.1
2010/0106966 A1 * 4/2010 Santos .................... H04L 12/66 370/328
2012/0230193 A1 * 9/2012 Fang .................. H04W 12/069 370/235
2013/0155876 A1 * 6/2013 Potra .................. H04L 12/6418 370/248
2013/0246575 A1 * 9/2013 Giaretta .............. H04L 12/5692 709/217
2013/0254378 A1 * 9/2013 Meylan ................... H04L 47/70 709/224
2013/0298209 A1 * 11/2013 Targali ................. H04W 12/06 726/6

(Continued)

*Primary Examiner* — Christopher T Wyllie
(74) *Attorney, Agent, or Firm* — Eversheds Sutherland (US) LLP

(57) ABSTRACT

The disclosure describes techniques for enabling an electronic device to determine whether a service set identifier (SSID) associated with a wireless access point (WAP) is associated with a captive portal. If the electronic device determines that the SSID is not associated with a captive portal, the electronic device may determine to refrain from performing a captive-portal check upon establishing a connection with the WAP. For instance, the device may refrain from sending an HTTP Get or other request to a predefined URL and awaiting a predefined response upon determining that the SSID is not associated with a captive portal. In some instances, the electronic device may make this determination by communicating with one or more other electronic devices that store information indicating whether the SSID is associated with a captive portal. In other instances, the electronic device may make this determination by reading data stored in persistent memory.

20 Claims, 9 Drawing Sheets

(56) References Cited

U.S. PATENT DOCUMENTS

| | | | | |
|---|---|---|---|---|
| 2014/0344890 | A1* | 11/2014 | Warrick | H04L 61/4511 726/1 |
| 2015/0067782 | A1* | 3/2015 | Choi | H04L 63/10 726/3 |
| 2015/0142947 | A1* | 5/2015 | Dyba | H04L 12/1435 709/224 |
| 2015/0271640 | A1* | 9/2015 | Guday | H04W 4/021 370/338 |
| 2015/0372870 | A1* | 12/2015 | Stiff | H04W 12/04 370/338 |
| 2016/0014660 | A1* | 1/2016 | Bar | H04W 12/08 455/439 |
| 2016/0156719 | A1* | 6/2016 | Mobarak | H04L 67/56 726/4 |
| 2016/0191524 | A1* | 6/2016 | Bathija | H04L 47/10 726/3 |
| 2017/0111269 | A1* | 4/2017 | Baumgartner | H04L 63/0272 |
| 2017/0156113 | A1* | 6/2017 | Visuri | H04L 12/5692 |
| 2017/0346853 | A1* | 11/2017 | Wyatt | G06F 21/56 |
| 2018/0048534 | A1* | 2/2018 | Banga | G06N 20/00 |
| 2018/0070231 | A1* | 3/2018 | Barbu | H04W 12/06 |
| 2018/0077572 | A1* | 3/2018 | Trappitt | G06Q 30/0271 |
| 2018/0184363 | A1* | 6/2018 | Van Hamersveld | H04W 48/20 |
| 2018/0309757 | A1* | 10/2018 | Schonwald | H04L 63/0884 |
| 2019/0104559 | A1* | 4/2019 | Verma | H04W 52/0241 |
| 2019/0158372 | A1* | 5/2019 | Shanbhag | H04L 61/5007 |
| 2019/0335516 | A1* | 10/2019 | Ringland | H04W 76/10 |
| 2019/0377902 | A1* | 12/2019 | Schroeder | G06F 21/6263 |
| 2020/0382401 | A1* | 12/2020 | Rudnik | H04W 76/12 |
| 2021/0112035 | A1* | 4/2021 | Prodoehl | H04L 63/08 |
| 2021/0119898 | A1* | 4/2021 | Lauer | H04L 67/02 |
| 2021/0392719 | A1* | 12/2021 | Rane | H04B 17/382 |
| 2022/0167237 | A1* | 5/2022 | Itagaki | G06F 13/00 |
| 2022/0368795 | A1* | 11/2022 | Osann, Jr. | G01S 19/52 |
| 2023/0072886 | A1* | 3/2023 | Kim | H04W 36/0061 |
| 2023/0073686 | A1* | 3/2023 | Li | H04L 5/0092 |
| 2023/0076781 | A1* | 3/2023 | Kim | H04W 48/02 |
| 2023/0146463 | A1* | 5/2023 | Agarwal | H04L 67/535 726/23 |
| 2024/0314677 | A1* | 9/2024 | Munõz De La Torre Alonso | H04W 12/06 |
| 2026/0164235 | A1* | 6/2026 | Ferdi | H04W 12/06 |

* cited by examiner

IDENTIFYING SSIDs ASSOCIATED WITH CAPTIVE PORTALS

BACKGROUND

As computing devices continue to evolve, the amount of computing devices used in everyday life continues to proliferate. For instance, daily life often includes use of an array of client computing devices, such as mobile phones, tablet computing devices, voice-controlled devices, smart televisions, HDMI plug-in sticks, audiovisual devices, and the like. In many instances, each of these client computing devices are configured to access content and/or communicate with other devices over the Internet by connecting to a wireless access point (WAP) within the home environment. Given the ever-increasing amount of devices within different environments, as well as users' ever-increasing reliance on these devices, ensuring connection between each client device and a local WAP remains important.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
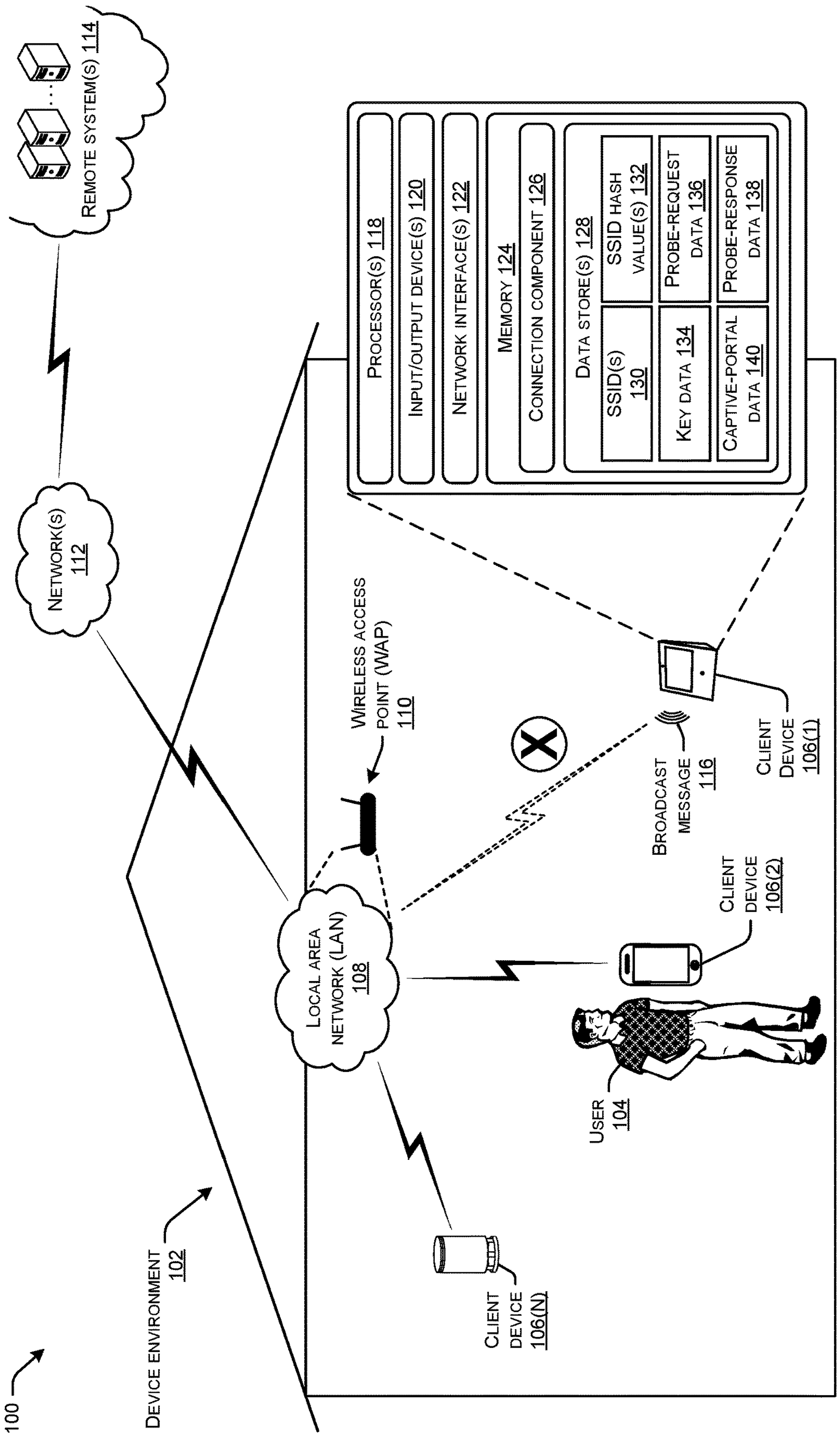
FIG. 1 illustrates a schematic diagram of an illustrative architecture including a device environment that includes multiple client devices configured to communicate with remote systems after connecting to a local area network (LAN) provided by a wireless access point (WAP) within the system. In some instances, a client device may be configured to perform a captive-portal check as part of a connection process with a WAP. However, within the architecture the client device may communicate with one or more other peer client devices to determine whether the WAP is behind a captive portal and, if not, may refrain from performing the captive-portal check.

The disclosure describes, in part, techniques for enabling an electronic device to determine whether a service set identifier (SSID) associated with a wireless access point (WAP) is associated with a captive portal. If the electronic device determines that the SSID is not associated with a captive portal, the electronic device may determine to refrain from performing a captive-portal check upon establishing a connection with the WAP. For instance, the device may refrain from sending an HTTP Get or other request to a predefined URL and awaiting a predefined response upon determining that the SSID is not associated with a captive portal. In some instances, the electronic device may make this determination by communicating with one or more other electronic devices that store information indicating whether the SSID is associated with a captive portal. In other instances, the electronic device may make this determination by reading data stored in persistent memory of the electronic device indicating whether the SSID is associated with a captive portal.

As is known, some SSIDs are associated with respective captive portals, such that web browsers or other network applications executing on the client devices that connect to the respective SSID are automatically directed to a particular location (e.g., URL or webpage) for performing some action prior to being granted full connection to the network (e.g., the Internet). For instance, when a client device that connects to an SSID associated with a WAP that sits behind a captive portal, the WAP may direct a web browser or other application of the client device to a predefined URL that serves a webpage to the client device and requests that a user of the client device sign in, agree to certain terms and conditions, and/or the like before the electronic device is granted access to the network. Upon receiving this requested information, the WAP may allow the client device to navigate to different URLs and generally use the network.

In some instances, client devices may be configured to perform a captive-portal check as part of a connection process with a WAP associated with an SSID. For instance, a first client device may be configured to perform a network scan upon being powered on, upon disconnecting from a network, upon wireless functionality of the first client device being turned on, or so forth. As part of this network scan, the first client device may broadcast or otherwise send a probe request indicating that the first client device is attempting to connect to a WAP. The first client device may send this probe request over WiFi, Bluetooth, WiFi direct, Zigbee, and/or any other wired or wireless protocol. In some instances, however, the probe request may also include a request for information regarding whether any SSID(s) in the local environment of the first client device are associated with a captive portal. For instance, a field of the probe request may include data requesting information regarding whether any SSID(s) are associated with a captive portal and/or may include data requesting whether a particular, specified SSID is associated with a captive portal. In the latter instances, the probe request may include the SSID, a hash value of the SSID, or any other information that may be used for a receiving device to determine or otherwise identify the SSID. In some instances, the probe-request data or other data may specify the hash value of the SSID and a time associated with the sending of the probe-request data. Further, while this example describes the first client device sending this data as part of a probe request, in other instances the first client device may send this data via a Public Action Vendor frame or via any other mechanism.

In some instances, one or more WAPs within the environment of the first client device may receive the probe request and may reply with information to enable the first client device to establish a connection with the first client device. In addition, one or more peer client devices in the environment may also receive the probe request. In response to receiving the probe request, a peer client device may analyze the probe request and identify the request for information regarding known SSID(s) that are not associated with captive portals and/or information regarding whether the specified SSID is associated with captive portal. If a peer device receives the probe request but is either unaware of any SSIDs that are not associated with a captive portal (or any SSIDs meeting the criteria and within the environment), and/or if the peer device receives the probe request and is unaware of whether the specified SSID is associated within a captive portal (or is unaware of the specified SSID, generally), then the peer client device may refrain from generating and/or sending probe-response data for the first client device.

If, however, the peer client device identifies one or more SSID(s) that are not associated with a captive portal (and potentially are within the local environment), the peer client device may generate probe-response data indicating these SSID(s). In other instances, if the probe-request data specified a particular SSID (or a hash value of a particular SSID), and the peer client device stores data indicating that this particular SSID is not associated with a captive portal, then the peer client may generate the probe-response data that includes this information. In each instance, the probe-response data may indicate the SSID(s) (e.g., via a hash value) and, potentially, a last time at which the peer client device connected to the respective SSID without going through a captive portal.

After broadcasting or otherwise outputting the probe-request data, the first client device may, upon receiving a response from a WAP, begin to establish a connection with the WAP. This may include authenticating and associating with the WAP, exchanging key data within the WAP, and acquiring an Internet Protocol (IP) address associated with the WAP. In some instances, however, before performing a captive-portal check, the first client device may determine whether a captive-portal announcement has been received. For instance, the first client device may determine whether probe-response data has been received from a peer client device and, if so, whether the probe-response data indicated that the SSID to which the first client device is establishing a connection with is not associated with a captive portal. While this example describes the captive-portal announcement as being received by the first client device via the probe-response data, in other instances a peer client device may send this data to the first client device in any number of other ways.

If the first client device determines that no captive-portal announcement has been received, the first client device may proceed to perform the predefined captive-portal check. This may include sending an HTTP Get or other request to a predefined URL and determining whether a predefined, expected response is received within a threshold amount of time. If a response is received from the predefined URL, then the first client device may determine that the first client device is not associated with a captive portal. The first client device may then send notification data to one or more applications executing on the first client device indicating that the first client device has network connectivity. If, however, the predefined, expected response is not received, then the first client device may determine that the SSID is associated with a captive portal and may store a corresponding indication. The first client device may refrain from notifying the applications that the first client device until the requirements called by the webpage associated with the captive portal are met and network connectivity is established.

While the above example describes peer client devices sending a response to the first client device to indicate that the specified SSID, or other SSID in the environment, is not associated with a captive portal, in other instances the peer client devices may be configured to send a response upon determining that the SSID is associated with a captive portal. In these instances, the first client device may refrain from performing the captive-portal check unless a response is received, rather than the opposite as described above. Further, while this example describes the first client device communicating with peer client devices to determine whether to perform a captive-portal check upon establishing a connection with a WAP, in some instances the first client device may additionally or alternatively determine whether it stores information in memory indicating whether a particular SSID is associated with a captive portal. For instance, after receiving an indication from a peer client device indicating that a particular SSID is not associated with a captive portal, and/or after performing a captive-portal check and determining that the SSID is not associated with a captive portal, the first client device may store a corresponding indication in persistent memory of the first client device. Therefore, upon disconnecting from the SSID and attempting to reconnect to the SSID at a later time, the first client device may read, from the persistent memory, the indication that the SSID is not associated with the captive portal and may refrain from performing the captive-portal check.

Further, while the above example describes an environment where a peer client device receives the probe-request data from the first client device and determines to send a response indicating that a specified SSID is not associated with a captive portal, in some instances the environment may include multiple peer client devices configured to share this information with the first client device. In these instances, each peer client device may be configured to generate and send the probe-response data unless the respective peer client device receives probe-response data from another peer client device, indicating that the other peer client device has already responded to the first client device. In some instances, each peer client device may be configured to execute random backoff to avoid collisions with respect to sending the probe-response data. For instance, the peer devices may be configured to implement a random backoff in addition to the one provided by the lower layer WiFi MAC.

While the above examples describe client electronic devices outputting (e.g., broadcasting) data requesting information regarding whether other client devices are aware of whether a particular SSID, or any local SSID(s), are associated with a captive portal, in some instances the WAP in the environment may be configured to inform a client device of this information. In these examples, a client electronic device may output a traditional probe request that requests connection with a local WAP associated with an SSID. The WAP may be configured to respond to the probe request within the traditional information used for establishing a connection between the client device and the WAP, as well as with data indicating whether the WAP is associated with a captive portal. Upon receiving an indication that the WAP is not associated with a captive portal, the client electronic device may be configured to establish a connection with the WAP and inform application(s) executing on the device that the device has network connectivity without first performing a captive-portal check. If, however, the client electronic device receives an indication that the WAP is associated with a captive portal, or the WAP does not specify, then the client electronic device may be configured to perform the captive-portal check.

As will be appreciated, the techniques described herein lessen the amount of captive-portal checks that will be performed by the client devices by allowing these devices to refrain from performing these checks in instances where WAPs are associated with SSIDs that are known to not reside behind a captive portal. Thus, these techniques save computational expense and connection time when establishing connections with WAPs and lessen the burden on the servers associated with the predefined URLs used when performing the captive-portal checks. In some instances, fewer servers may be deployed for purposes of performing captive-portal checks when these front-end techniques are implemented.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative architecture 100 in which the techniques may be implemented. In this example, the architecture 100 includes a device environment 102 that includes an example user 104 and multiple example client devices 106(1), 106(2), . . . 106(N) (collectively, "client devices 106"). The client devices 106 may comprise mobile phones, tablet computing devices, audiovisual devices, smart televisions, laptop computers, voice-controlled devices, HDMI plug-in sticks, wearable devices and/or any other type of client computing device. Further, each of the client devices 106 may be configured to establish a connection with a local area network (LAN) 108 via a wireless access point (WAP) 110 in the environment. Upon establishing a connection with the LAN 108 via the WAP 110, each client device may be coupled to one or more networks 112 for accessing an array of remote systems 114.

As illustrated, the client device 106(N) and the client device 106(2) have established a connection with the WAP 110, while the client device 106(1) has not yet established a connection. In this example, the client device 106(1) may generally be configured to perform a captive-portal check as part of the connection process with the WAP 110 and prior to informing applications executing on the client device 106(1) that the client device 106(1) has network connectivity. In some instances, performing a captive-portal check may comprise the client device 106(1) sending a request (e.g. an HTTP GET request) to a predefined URL stored in memory of the client device 106(1). The client device 106(1) may also store an expected response in memory of the client device 106(1), such that if the predefined, expected response is received, the client device 106(1) may determine that the WAP 110 is not behind a captive portal and, thus, the client device 106(1) may inform the applications stored on the client device 106(1) that the client device 106(1) has network connectivity. If, however, the predefined, expected response is not received, then the client device 106(1) may refrain from informing the applications of network connectivity until the requirements of the captive portal are met (e.g., agreeing to terms and conditions, signing in, etc.).

As described herein, however, the client device 106(1) may be configured to first determine whether the WAP 110 is associated with a captive portal prior to performing the captive-portal check. For instances, the client device 106(1) may read data stored in its memory, communicate with peer client devices 106(2)-(N), communicate with the WAP 110, and/or the like to make this determination, as described in further detail below. In some instances, the client device 106(1) may output a broadcast message 116 for requesting information regarding whether the SSID associated with the WAP 110 is associated with a captive portal, as described in detail below.

As illustrated, the client device 106(1) includes one or more processors 118, one or more input/output devices 120, one or more network interfaces 122 for enabling wireless connections to the WAP 110 and otherwise, and memory 124. The processor(s) 118 may comprise physical hardware processors, each having one or more processing cores. The input/output devices 120 may comprise displays, speakers, microphones, touchscreens, keyboards, and/or any other type of device capable of receiving or outputting input/content. The network interfaces 122 may enable connections over WiFi, Bluetooth, Zigbee, and/or any other type of wired and/or wireless network.

The memory 124 may store a connection component 126 for establishing a connection with the WAP 110 and other WAPs, as well as for performing captive-portal checks. The memory 124 also stores one or more data stores 128, amongst other software and/or firmware, such as an operating system, other client applications, and the like. The connection component 126 may be configured to initiate a connection between the client device and the WAP 110 (or other WAPs) in response to a trigger, such as a request from a user, an application, or the like. The connection component 126 may be configured to instruct a wireless driver to initiate the connection.

The data stores, meanwhile, may store information related to current and/or previous connections between the client device 106 and/or the WAP 110 or other WAPs. For instance, the data stores may store one or more SSIDs 130 or other WAP-identifiers, corresponding passwords stored in association with the respective SSIDs, hash values 132 of the SSIDs, key data 134 associated with the client device 106(1) and/or the WAP, and so forth. This data may be used to establish connections with WAPs, such as the WAP 110, as well to determine whether a WAP is behind a captive portal. In addition to the above, the data stores 128 may store probe-request data 136 and probe-response data 138 for establishing a connection with respective WAPs, as well as for determining whether a particular WAP is associated with a captive portal. The data stores 128 may also store captive-portal data 140, which may indicate whether particular SSIDs are associated with a captive portal. The client device 106(1) may use the captive-portal data 140 to determine whether a particular SSID is associated with a captive portal, such as when the client device 106(1) loses connection and attempts to reestablish a connection with a WAP. In addition, the client device 106(1) may use the captive-portal data 140 to share with other client devices that are requesting information regarding a particular SSID(s) or information about SSID(s) generally. As described below, while the examples of sharing information regarding captive portals may be determined using the probe-request data 136 and the probe-response data 138, it is to be appreciated that the information shared between the client devices (and, potentially, the WAP) may be shared using other types of mechanisms, such as via public action frames, and the like.

In one example within the environment 102 of FIG. 1, upon the client device 106(1) attempting to establishing a connection with the WAP, the client device 106(1) may output (e.g., broadcast) a probe request or other data for initiating a connection with a local WAP. In some instances, this data may include, in addition to traditional data for establishing a connection, data requesting for information regarding whether a specified SSID and/or whether local, known SSID(s) are associated with respective captive portals. For instance, the probe request may include a has value 132 of the SSID associated with the WAP 110 as well as a time associated with the request.

The WAP and the other client devices 106(2)-(N) in the environment may receive the probe request and may each determine whether the device knows if the specified SSID is associated with a captive portal and/or whether any known local SSIDs are associated with a captive portal. If one or more of the devices determine that the SSID or another known SSID is not associated with a captive portal, the respective device may generate and output data indicating as such to the client device 106(1). This information may comprise a hash value of the SSID for which the device is communicating about, as well as a time at which the device last connected to that SSID. In some instances, this data may be sent as a part of a probe response, a probe request, a public action frame, or via any other mechanism. Further, while this example describes example data, it is to be appreciated that the devices may identify the SSID(s) in other ways. It is also to be appreciated that the peer devices may send data indicating a single SSID that is known to not be associated with a captive portal, or may identify multiple SSIDs that are known to not be associated with captive portals.

Before introducing, with reference to FIG. 2, the operations of the components illustrated in FIG. 1, it is to be appreciated that some or all of the instances of the components illustrated with reference to the client device 106(1) may also be stored on the other client devices 106. In addition, it is to be appreciated that the network(s) 112 which connect the client devices 106 to the remote systems 114 may represent an array or wired networks, wireless networks (e.g., WiFi), or combinations thereof. The remote systems 114 may comprise network-accessible systems—or "cloud-based systems"—implemented as computing infrastructures of processors, storage, software, data access, and so forth that is maintained and accessible via the network(s) 112, such as the Internet. Cloud-based systems may not require end-user knowledge of the physical location and configuration of the system that delivers the services. As illustrated, the remote systems 114 may comprise network-accessible resource(s), such as servers. Multiple of such resources may be included in each of the systems 114 and each may include processors and memory. As used herein, a processor may include a central processing unit (CPU) for processing data and memory may include computer-readable storage media storing computer-readable instructions that are executable on the respective processor(s). The computer-readable media may individually include volatile random access memory (RAM), non-volatile read only memory (ROM), non-volatile magnetoresistive (MRAM) and/or other types of memory.

Figure 2A:
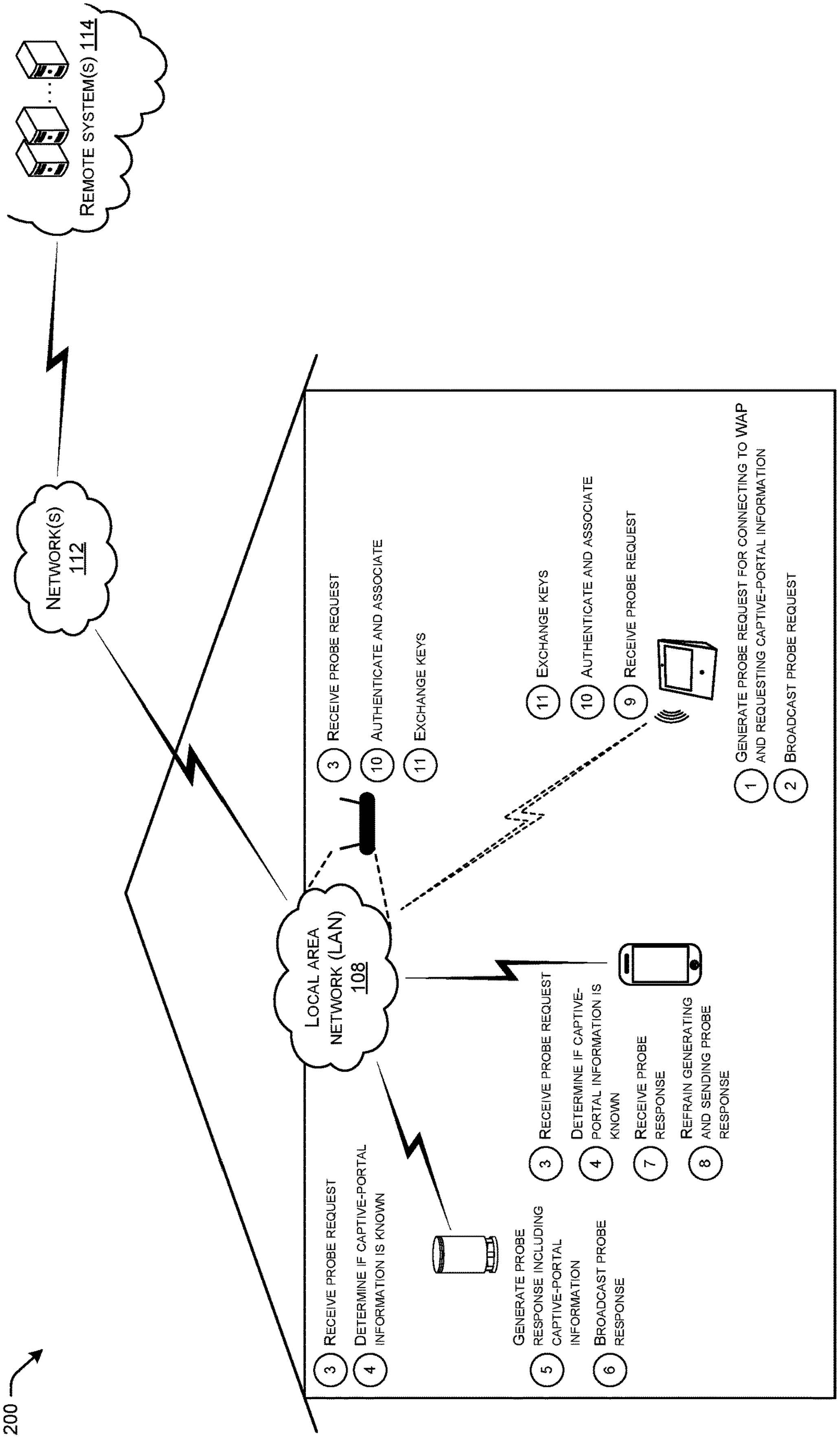
FIGS. 2A-B collectively illustrate a sequence of operations in which a first client device attempts to communicate with one or more peer devices in an environment as part of a connection process with a local WAP to attempt to determine whether the WAP is associated with a captive portal. If a peer client device stores information indicating that the WAP is not associated with a captive portal, it may send a corresponding response to the first client device. Upon receiving this indication, the first client device may refrain from performing a captive-portal check.
Figure 2B:
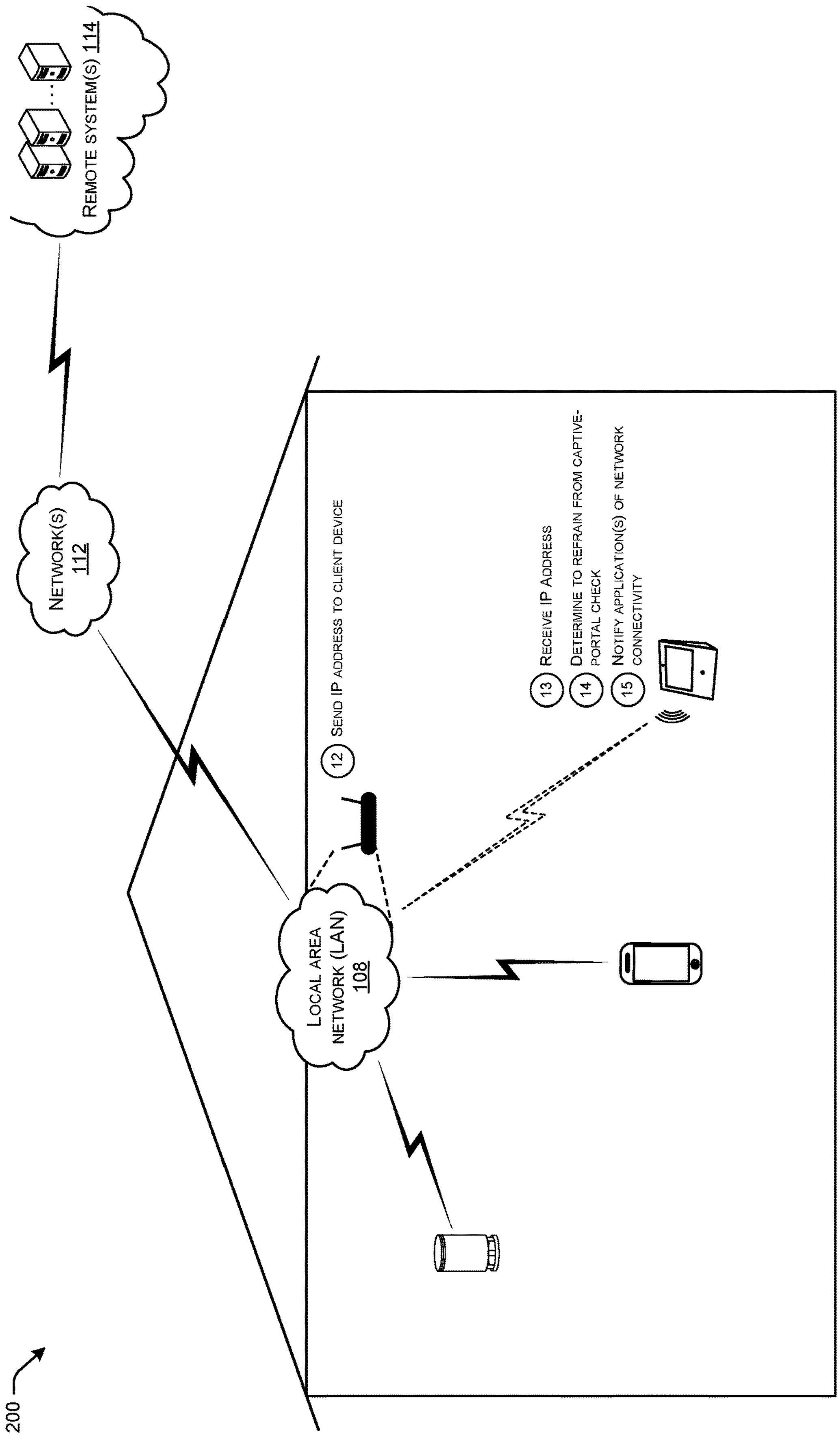

FIGS. 2A-B collectively illustrate a sequence of operations 200 in which the example client device 106(1) attempts to communicate with one or more peer devices in an environment 102 as part of a connection process with a local WAP 110 to attempt to determine whether the WAP 110 is associated with a captive portal. If a peer client device stores information indicating that the WAP 110 is not associated with a captive portal, it may send a corresponding response to the client device 106(1). Upon receiving this indication, the first client device 106(1) may refrain from performing a captive-portal check.

At "1", the example client device 106(1) generates a probe request for connecting to a WAP in the environment (e.g., the WAP 110), with this probe request including a request for captive-portal information. While in this example the request for captive-portal information is part of the probe request for establishing the connection with the WAP 110, in other instances this request may be separate from the probe request. Further, this request for captive-portal information may be sent via WiFi, Bluetooth, and/or any other communication channel.

At "2", the client device 106(1) outputs (e.g., broadcasts) the probe request within the environment. Again, this probe request may be output via WiFi, Bluetooth, and/or any other communication channel.

At "3", the WAP 110 and the peer client devices 106(2) and 106(N) in the environment 102 receive the broadcasted probe request. At "4", each of the peer client devices may determine whether captive-portal information is known for the specified SSID. For instance, each of the client devices may analyze its respective memory to determine whether it stores an indication regarding whether the SSID associated with the WAP 110 is behind a captive portal or not. In some instances, these devices may store an indication when an SSID is not behind a captive portal, when an SSID is behind a captive portal, or in either instance. Further, while this example describes the client device 106(1) requesting information regarding the SSID associated with the WAP 110 and the client devices 106(2) and 106(N) determining whether they know captive-portal information regarding this SSID, in other instances the request from the client device 106(1) may be more general and may request information regarding any known (potentially local) SSIDs that are not behind a captive portal, and the client devices 106(2) and 106(N) may return information regarding any known SSID that is not behind a captive portal (and potentially that are local).

At "5", the client device 106(N) may generate a probe response including the captive-portal information for the specified SSID. For example, the probe response may include captive-portal information identifying the SSID associated with the WAP and indicating that the SSID is not behind a captive portal. For instance, the probe response may include a hash value of the SSID, as well as time data indicating a time (e.g., a last time) that the client device 106(N) connected to the SSID.

At "6", the client device 106(N) may broadcast the probe response that includes the captive-portal information. In some instances, this probe response may be output via WiFi, Bluetooth, and/or any other communication channel.

At "7", the client device 106(2) receives the probe response broadcasted by the client device 106(N). and, at "8", the client device 106(2) determines to refrain from generating and/or sending probe-response data based at least in part on receiving the probe response from the client device 106(N). That is, because the client device 106(2) determines that the client device 106(N) has already broadcast and sent the probe response, the client device 106(2) may refrain from sending this information. At "9", the client device 106(1) also receives the probe response from the client device 106(N).

At "10", the WAP 110 and the client device 106(1) engage in an authentication and association process for establishing a connection between the client device and the WAP. This authentication and association process may comprise a traditional process for establish a wireless connection between the client device 106(1) and the WAP 110. Similarly, at "11", the WAP 110 and the client device 106(1) engage in an exchange of keys for establishing a connection between the client device 106(1) and the WAP 110.

FIG. 2B continues the illustration of the sequence of operations 200 and includes, at "12", the WAP 110 sending its IP address to the client device 106(1). At "13", the client device 106(1) receives the IP address from the WAP 110 for establishing a connection with the WAP.

At "14", the client device 106(1) determines to refrain from performing a captive-portal check based at least in part on receiving the probe response from the client device 106(N). That is, the client device 106(1) may analyze the probe response to determine that the client device 106(N) has indicated that the SSID associated with the WAP 110 is not associated with a captive portal. Therefore, at "15", the client device 106(1) notifies the application(s) executing on the client device 106(1) of the available network connection without first performing a captive-portal check, such as sending a request to a predefined URL and awaiting a predefined response.

Figure 3:
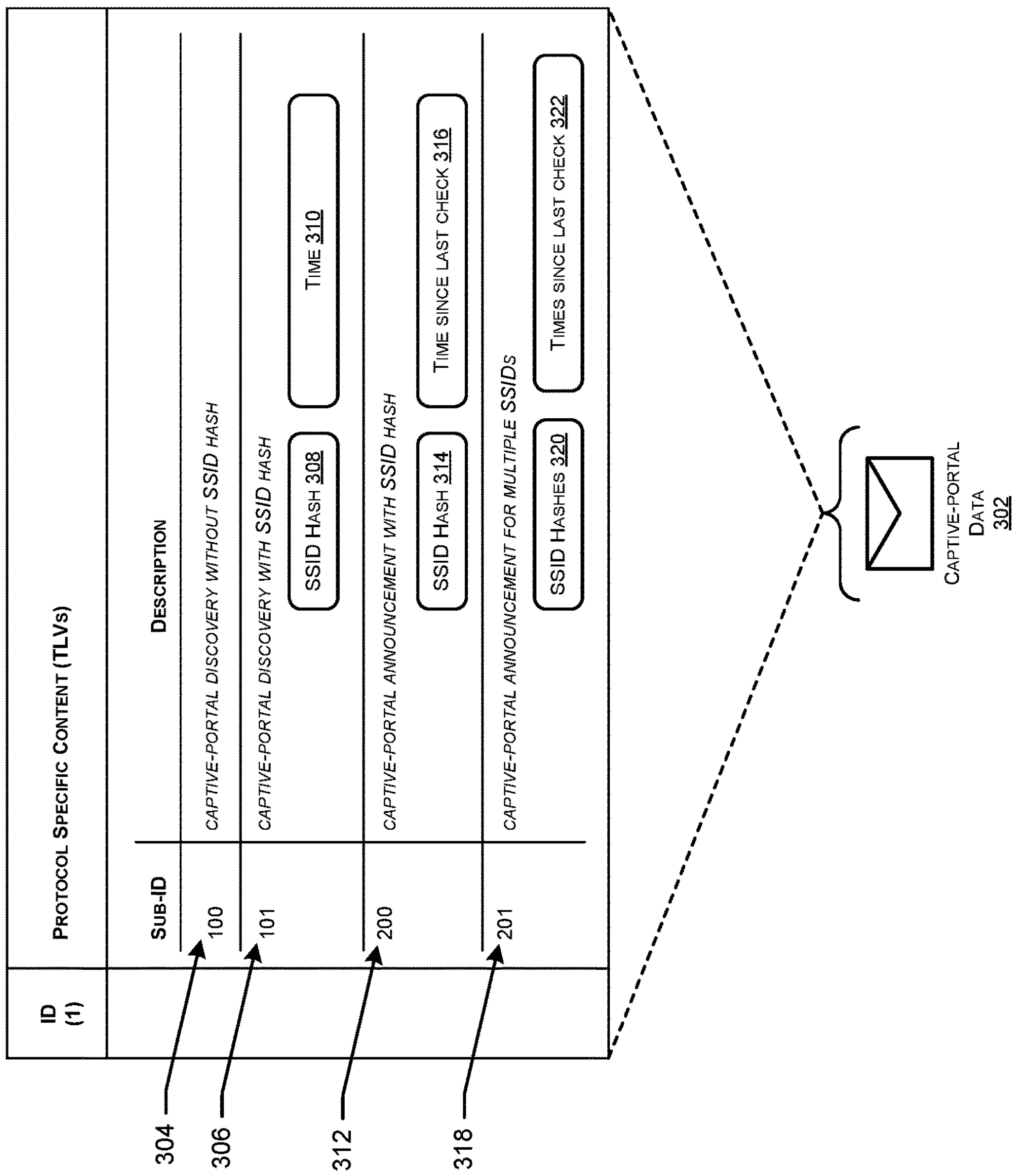
FIG. 3 illustrates an example data structure of a probe request the first client device may send and a probe response that a peer client device may send in response to receiving a probe request. For instance, the first client device of FIG. 1 may send probe-request data attempting to begin establishing a connection with the local WAP, with the probe-request data also including a request for information regarding whether an SSID associated with the WAP (or other SSIDs associated with other WAPs) is associated with a captive portal. Upon a peer client device determining that it stores information indicating an SSID that is not behind a captive portal, the peer client device may generate and send probe-response data that includes this information for use by the first client device.

FIG. 3 illustrates an example data structure that may carry captive-portal data 302 that a client device may send to request information regarding whether an SSID is associated with a captive portal and/or that a client device may send to indicate whether an SSID is known to not be behind a captive portal. In some instances, this data structure may form a portion of a probe request, a probe response, or a public action frame. For instance, the client device 106(1) may send probe-request data attempting to establish a connection with the local WAP 110, with the probe-request data also including a request for information regarding whether an SSID associated with the WAP 110 (or other SSIDs associated with other WAPs) is associated with a captive portal. Upon a peer client device determining that it stores information indicating an SSID that is not behind a captive portal, the peer client device may generate and send probe-response data that includes this information for use by the client device 106(1). In some instances, the request for information and the response may both form a portion of a probe request.

Regardless of the format of the data structure, as illustrated, the captive-portal data 302 may include a first field 304 for allowing a client device to specify a request for information regarding whether any peer client devices are aware of any SSIDs in the local environment that do not sit behind a captive portal. That is, the requesting client device may use the first field 304 to send a general request for information regarding any one or more SSIDs that are not associated with a captive portal.

In addition, the captive-portal data 302 may include a second field 306 to allow the client device to request information regarding whether a specified SSID is associated with a captive portal. For instance, a client device attempting to establish a connection with a particular SSID may use the second field 306 for specifying the SSID (e.g., via an SSID hash value 308) that the client device is requesting information regarding. In addition, the second field 306 may also allow the client device to specify a time 310 associated with the request.

In addition, the captive-portal data 302 may include a third field 312 and a fourth field 318 that allows a peer client device to respond to a request for captive-portal information and, in this example, specify one or more SSIDs that the responding peer device knows is not behind a captive portal. The third field 312, for instance, allows the responding peer device to specify, via an SSID hash value 314, an SSID that the peer client device knows is not behind a captive portal. In some instances, the responding peer client device may specify the SSID hash value in response to receiving a request via the second field 306 representing a request for information regarding a specified SSID. The third field 312 may also specify a time 316 since the responding peer device last connected with the SSID that is not behind the captive portal.

The fourth field 318, meanwhile, may allow the responding peer device to indicate multiple known (potentially local) SSIDs that are not associated with a captive portal. For instance, the fourth field 318 may include one or more SSID hash values 320, representing SSIDs that the responding peer device has determined are not associated with a captive portal, as well as a respective time 322 at which the responding peer device last connected to the respective SSID.

Figure 4A:
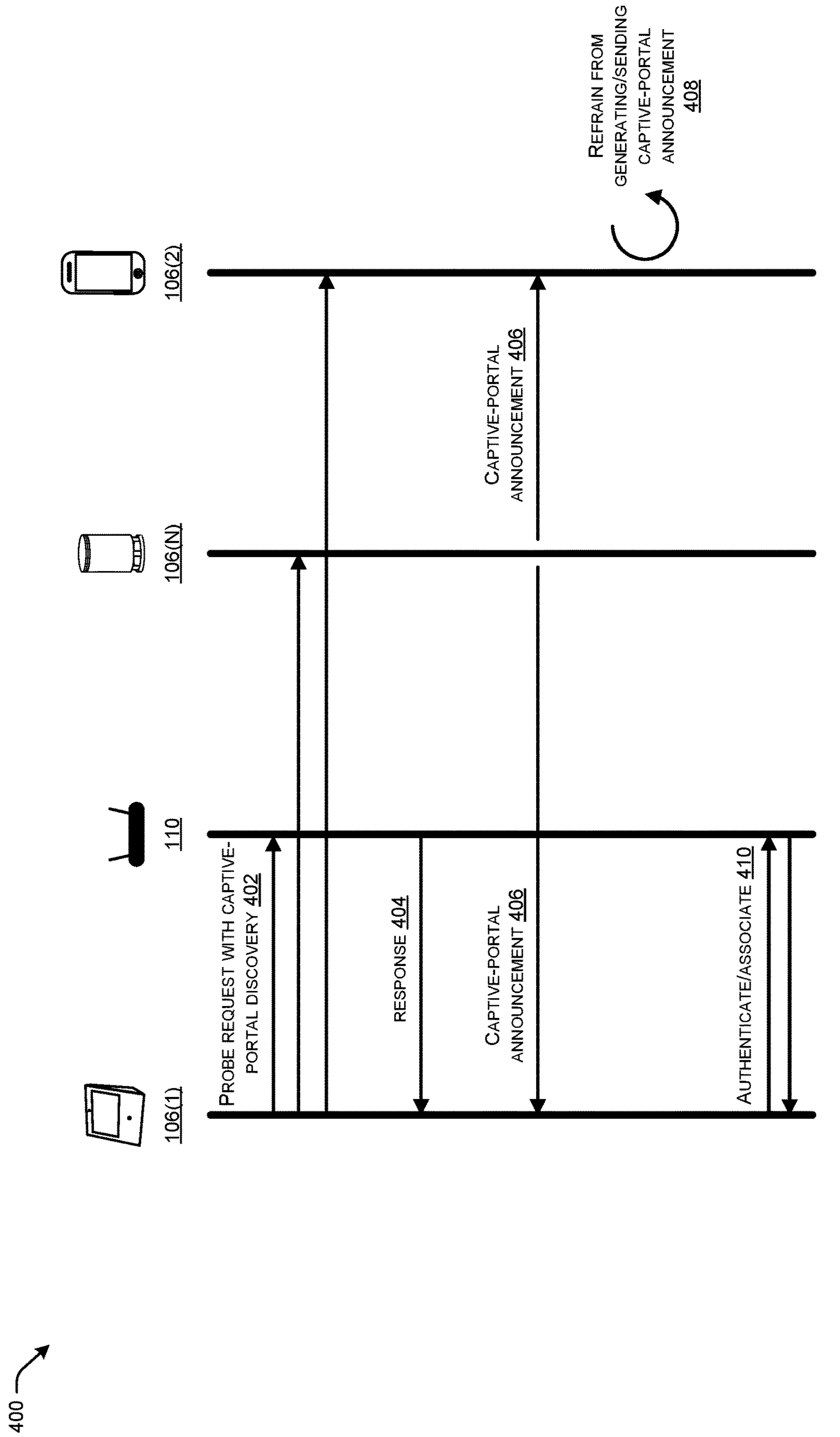
FIGS. 4A-B collectively illustrate another sequence of operations in which the first client device within the environment of FIG. 1 attempts to establish a connection with the WAP of FIG. 1, while also attempting to determine whether the SSID associated with the WAP is associated with a captive portal. Upon learning that the SSID is not associated with a captive portal, the first client device may refrain from performing a captive-portal check but may instead proceed directly to informing the applications stored on the device that the device now has network connectivity upon establishing a connection with the WAP.
Figure 4B:
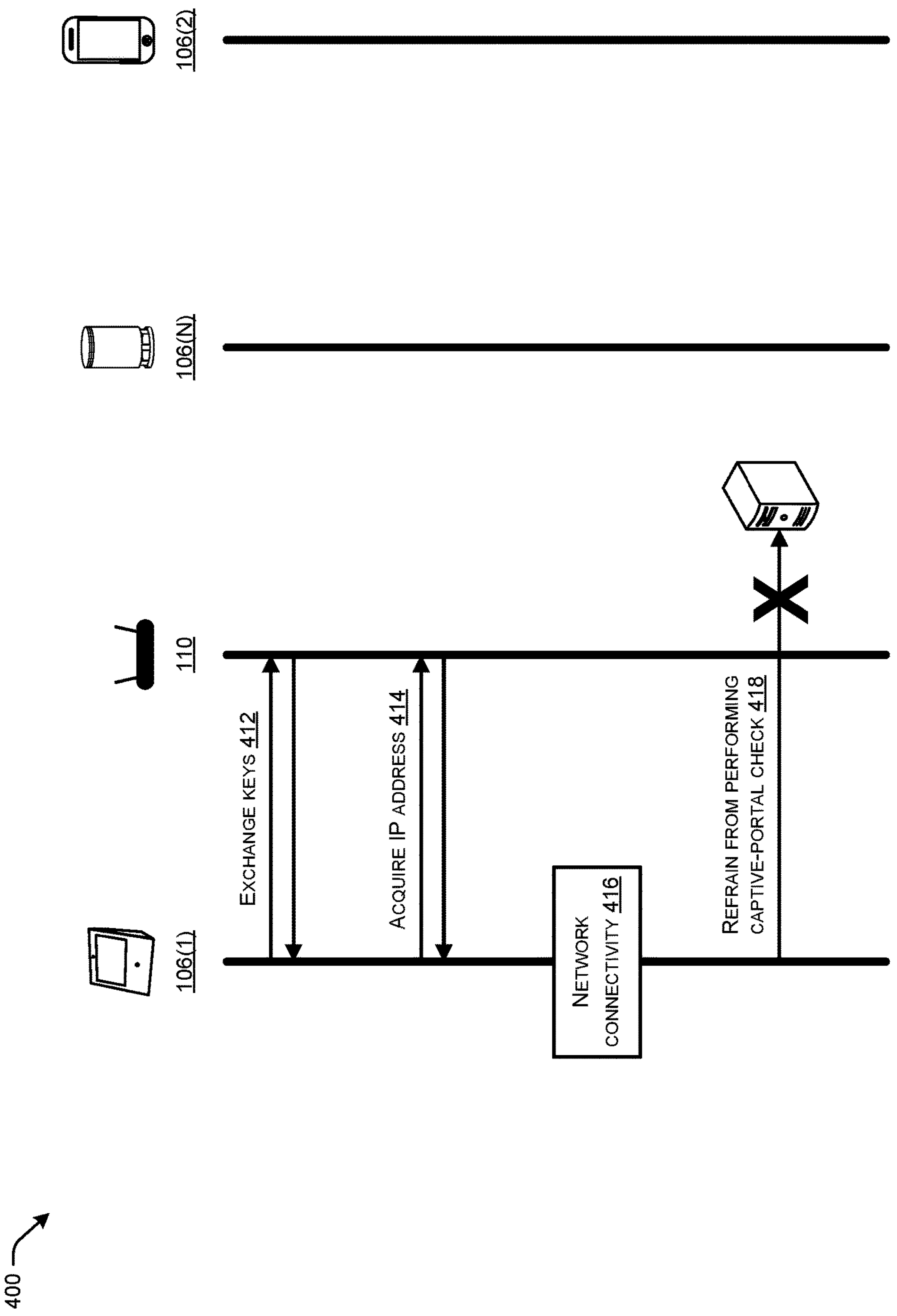

FIGS. 4A-B collectively illustrate another sequence of operations 400 in which the example client device 106(1) within the environment 102 attempts to establish a connection with the WAP 110, while also attempting to determine whether the SSID associated with the WAP 110 is associated with a captive portal. To begin, the client device 106(1) may output (e.g., broadcast) a probe request with a captive-portal discovery request at an operation 402. For instance, the client device 106(1) may output data that includes data specified in the first field 304 and/or the second field 306 of the captive-portal data 302 described in FIG. 3. The devices in the environment, including the WAP and the additional client devices 106(2) and 106(N), may receive this probe request.

At an operation 404, the WAP 110 may send a response to the probe request for allowing the WAP 110 and the client device 106(1) to begin establishing a connection. At an operation 406, the example client device 106(N) may also output (e.g., broadcast) a captive-portal announcement in response to the captive-portal discovery request. Here, the client device 106(N) may have determined that the WAP 110 and/or another WAP in the environment 102 is not associated with a captive portal and, in response, the client device 106(N) may generate and send the captive-portal announcement. In some instances, the captive-portal announcement may include the data shown in the third field 312 and/or the fourth field 318 of the captive-portal data 302 of FIG. 3.

At an operation 408, the peer client device 106(2) may receive the captive-portal announcement and determine its contents. In response, the client device 106(2) may refrain from generating and/or outputting a captive-portal announcement. At an operation 410, the client device 106(1) and the WAP 110 engage in a traditional authentication and association process for establishing a wireless connection.

FIG. 4B continues the illustration of the process 400 and includes, at an operation 412, the client device 106(1) and the WAP 110 exchanging cryptographic keys, also to establish a secure wireless connection between the two devices. At an operation 414, the client device 106(1) acquires the IP address of the WAP 110.

Before, after, or during the above operations for establishing the connection with the WAP, the client device 106(1) may determine that the captive-portal announcement has been received and may have analyzed this announcement to determine that the SSID associated with the WAP 110 is not associated with a captive portal. Thus, at an operation 416, the client device 106(1) may notify applications executing on the device 106(1) that the device 106(1) has network connectivity. In addition, at an operation 418, the client device 106(1) may refrain from performing the captive-portal check based at least in part on receiving the captive-portal announcement.

The process 400 and other processes described herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Finally, while some of the operations are described as being performed by certain devices or components in these examples, it is to be appreciated that other devices and components may perform some or all of these operations in other instances.

Figure 5A:
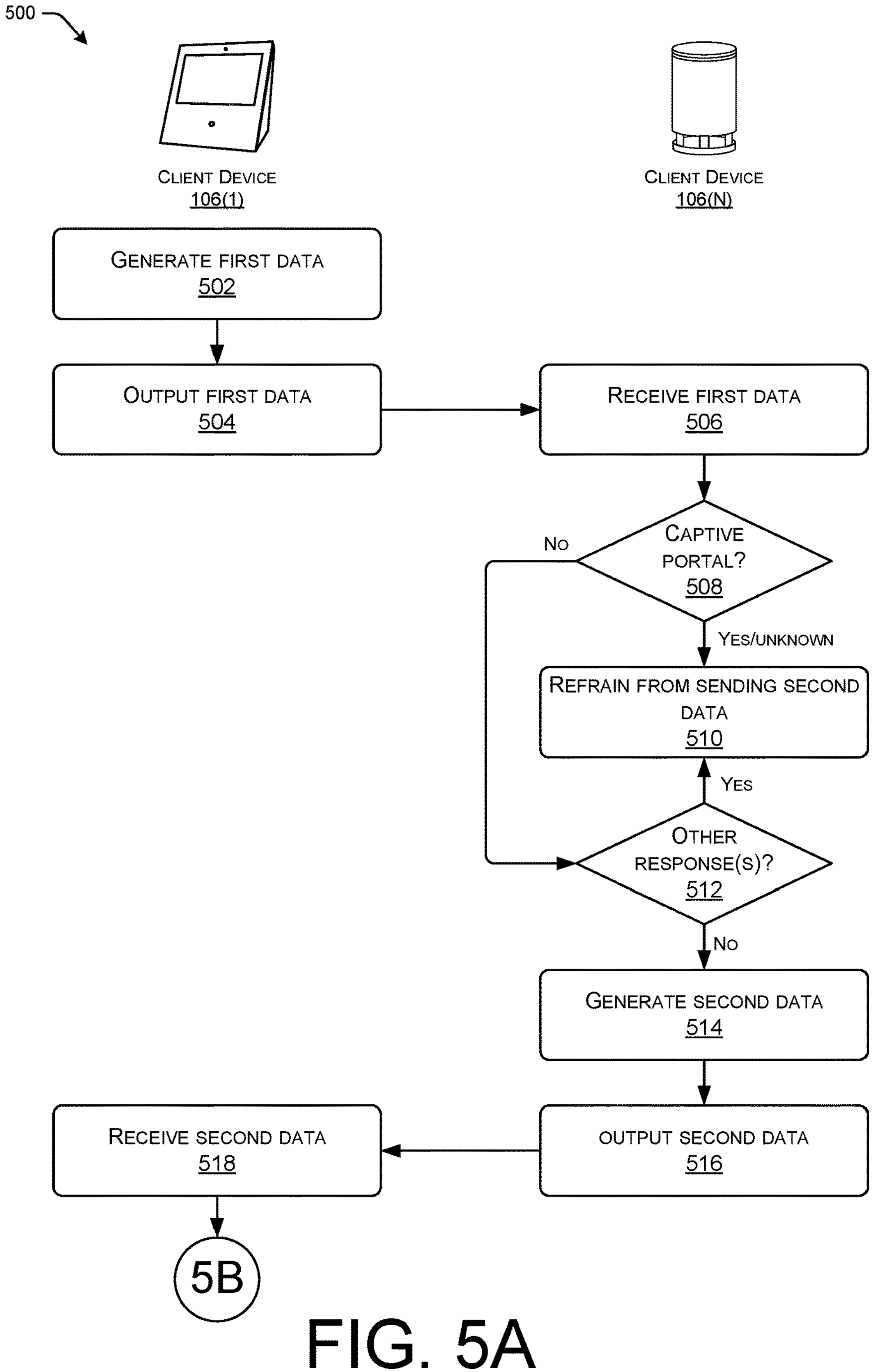
FIGS. 5A-C collectively illustrate a flow diagram of an example process in which a first client device attempts to establish a connection with a WAP, while also attempting to determine whether the SSID associated with the WAP is associated with a captive portal. Upon learning that the SSID is not associated with a captive portal, the first client device may refrain from performing a captive-portal check but may instead proceed directly to informing the applications stored on the device that the device now has network connectivity upon establishing a connection with the WAP.
Figure 5B:
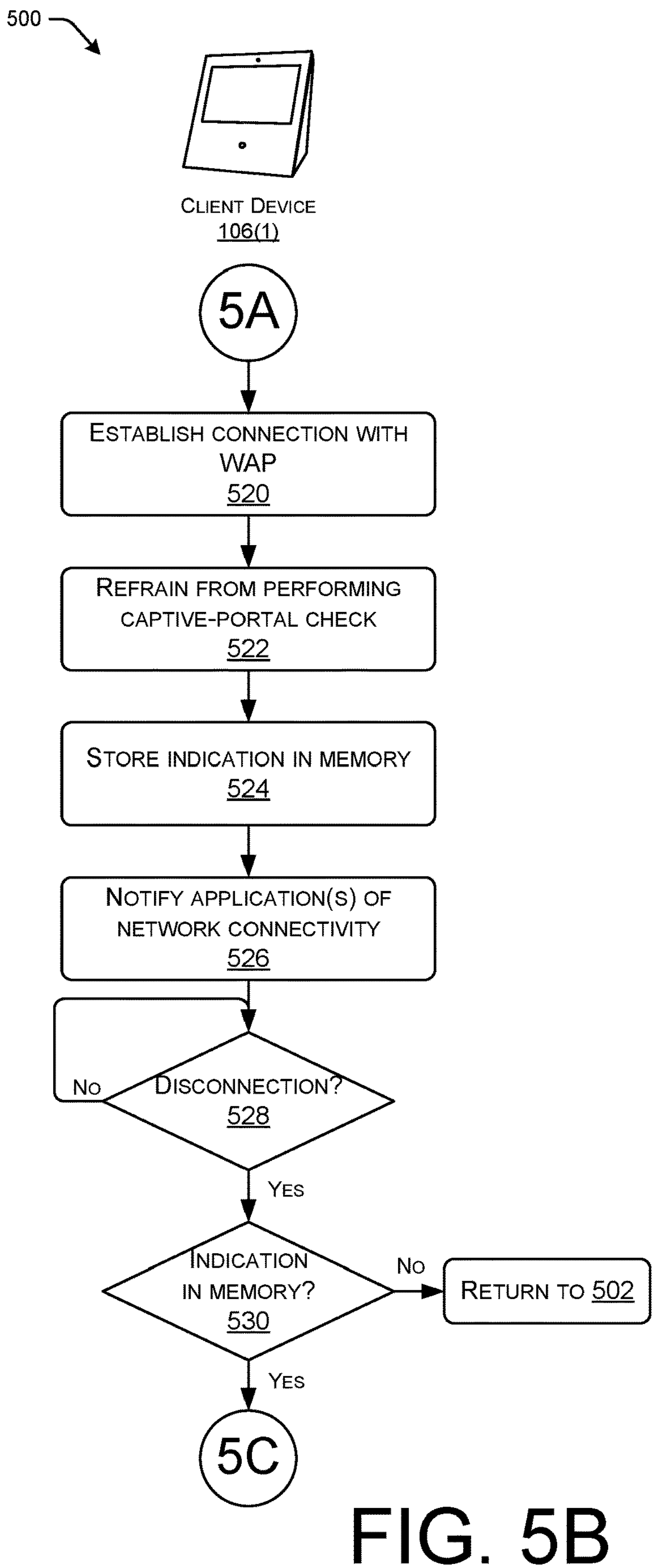
Figure 5C:
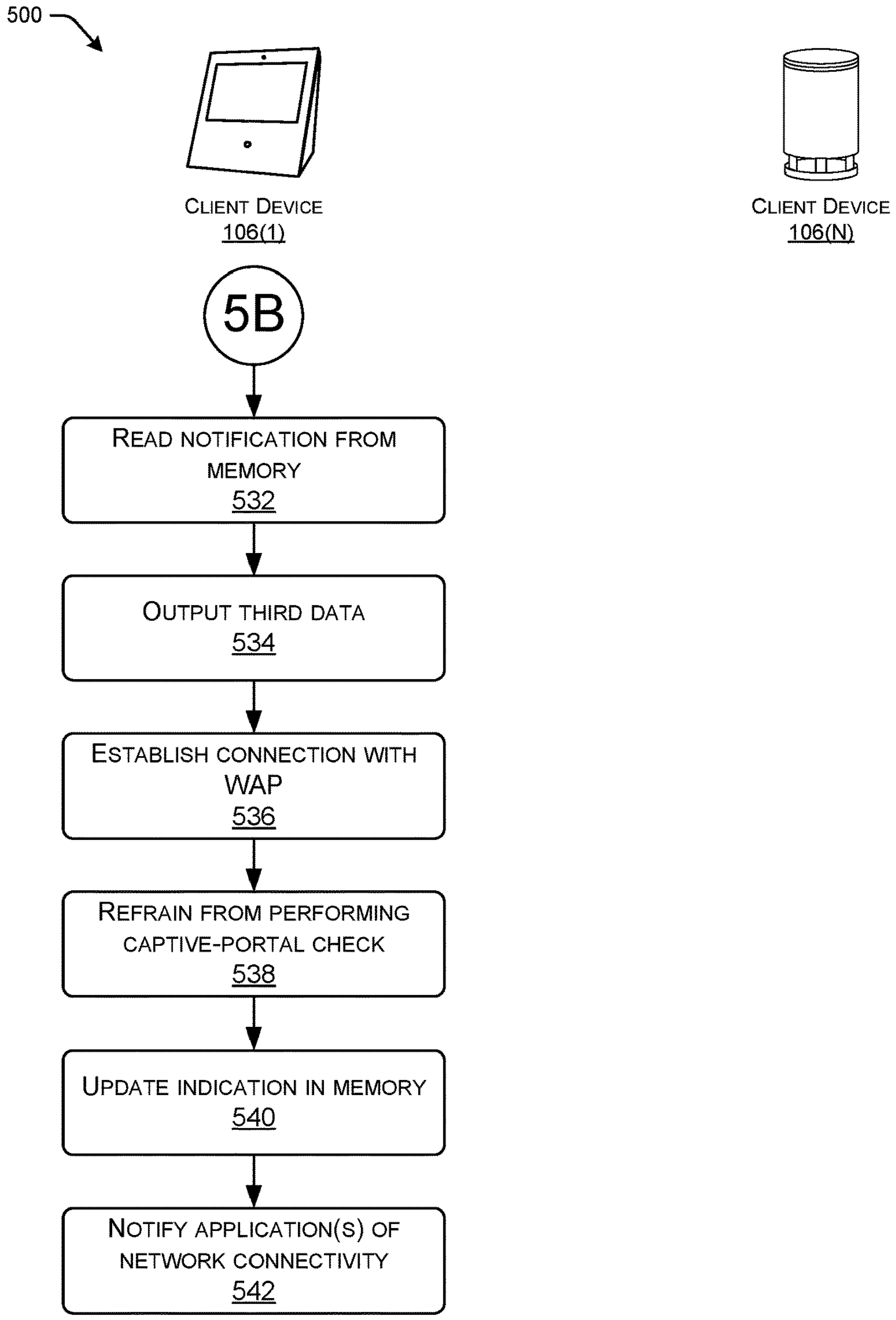

FIGS. 5A-C collectively illustrate a flow diagram of an example process 500 in which a first client device attempts to establish a connection with a WAP, while also attempting to determine whether the SSID associated with the WAP is associated with a captive portal. Upon learning that the SSID is not associated with a captive portal, the first client device may refrain from performing a captive-portal check but may instead proceed directly to informing the applications stored on the device that the device now has network connectivity upon establishing a connection with the WAP.

At an operation 502, the client device 106(1) generates first data for connecting to a WAP in an environment, wherein the WAP is associated with an SSID and the first data requests information regarding whether the SSID is associated with a captive portal. This first data may take the form of a probe request in some instances. For instance, the first data may correspond in whole or in part to the captive-portal data 302 described in FIG. 3. Further, while this example describes the first including the request for information regarding whether the SSID is associated with a captive portal along with the data for connecting with the WAP, in other instances the first data may include the former information separate from the latter data. Further, the request for the information regarding whether the SSID is associated with a captive portal may specify the SSID (e.g., via an SSID hash value) or may instead comprise a request for information regarding any SSID known by other client devices not to be associated with a captive portal. For instance, the request for the information may be specified via the first field 304 or the second field 306 described above with reference to FIG. 3.

At an operation 504, the client device 106(1) outputs the first data, such as broadcasting the first data within the environment that includes the WAP and the client device 106(N). At an operation 506, the client device 106(N) receives the first data from the client device 106(1). At an operation 508, the client device 106(N) determines whether the SSID is associated with the captive portal. For instance, upon receiving the first data, the client device 106(N) may read the request for the information (e.g., from the first field 304 or the second field 306). If the first data specifies a particular SSID (e.g., via an SSID hash value 308 via the second field 306), then the client device 106(N) may determine whether its memory stores an indication of whether this SSID is known to not be associated with a captive portal. For instance, the client device 106(N) may compute a hash value of each SSID it stores in memory and/or that the client device 106(N) currently sees in the environment in order to identify the specified SSID represented in the first data via the SSID hash value and may determine whether the persistent memory of the client device 106(N) stores an indication that this SSID is not associated with a captive portal (and/or whether the persistent memory stores an indication that this SSID is associated with a captive portal). If, however, the second data comprises a general request for information regarding SSIDs in the environment known to other client devices (e.g., the captive-portal discovery request of the first field 304), then the client device 106(N) may determine the SSID(s) in the local environment 102 and determine whether the client device 106(N) stores, in its persistent memory, one or more indications representing that one or more respective SSIDs are not associated with respective captive portals (and/or whether the client device 106(N) stores one or more indications representing that one or more respective SSIDs are associated with respective captive portals).

If the client device 106(N) determines that the SSID is associated with a captive portal, or if the client device 106(N) does not store this information, then at an operation 510 the client device 106(N) refrains from generating and/or sending second data indicating that the specified SSID is not associated with a captive portal. Similarly, if the client device 106(N) determines that no local SSID is known to not be associated with a captive portal, then the client device 106(N) may refrain from generating and/or sending second data indicating that the specified data is not associated with a captive portal.

If, however, the client device 106(N) determines that the SSID is not associated with a captive portal, then at an operation 512 the client device 106(N) determines whether second data has been received for the SSID from another peer client device. If so, then the client device 106(N)

refrains from generating and/or sending the second data at the operation 510. Similarly, if the client device 106(N) determines that one or more local SSIDs not specified in the first data are not associated with a captive portal, then at an operation 512 the client device 106(N) determines whether second data has been received for these SSID(s) from another peer client device. If so, then the client device 106(N) refrains from generating and/or sending the second data at the operation 510.

If the client device 106(N) determines that no other second data has been received, then at an operation 514, the client device 106(N) generates the second data indicating that the SSID is not associated with the captive portal. At an operation 516, the client device 106(N) outputs the second data, which may be received by the client device 106(1) at an operation 518.

FIG. 5B continues the illustration of the process 500 and includes, at an operation 520, the client device 106(1) establishing a connection with the WAP associated with the SSID. This may include traditional processes of authentication, association, and key exchanges. At an operation 522, the client device 106(1) refrains from performing a captive-portal check at least partly in response to receiving the second data. In some instances, this may include refraining from sending an HTTP GET request to a known uniform resource locator (URL) at least partly in response to receiving the second data. For instance, the received second data may take the form of a probe response, a probe request, a public action frame, and/or any other data structure. In some instances, the second data corresponds in whole or in part to the captive-portal data 302 from FIG. 3. In these instances, the second data may include information in the third field 312 or the fourth field 318. For instance, if the first data specified a particular SSID in the second field 306, then the second data may include information in the third field 312 indicating (via the SSID hash value 314) that the SSID specified by the client device 106(1) in the first data is not associated with a captive portal. If the first data did not specify a particular SSID, but rather included a general request in the first field 304, then the second data may include information in the fourth field 318 indicating (via one or more SSID hash values 320) that one or more SSID(s) are known by the client device 106(N) to not associated with a captive portal.

At an operation 524, the client device 106(1) stores, in persistent memory of the client device 106(1), an indication that the SSID (or multiple SSIDs) is not associated with the captive portal. At an operation 526, the client device 106(1) sends notification data to one or more applications executing on the client device 106(1) without first performing a captive-portal check, the notification data indicating that the client device 106(1) has network connectivity.

At an operation 528, the client device 106(1) determines whether it has experienced a disconnection from the WAP and/or the SSID. Upon experiencing a disconnection, at an operation 530, the client device 106(1) determines whether it stores captive-portal information in memory. If not, then the process may return to the operation 502. If so, however, then the process 500 may proceed to FIG. 5C.

If so, however, then at an operation 532, the client device 106(1) reads from memory the indication that the SSID is not associated with a captive portal. At an operation 534 and in response, the client device 106(1) may output third data indicating that the SSID associated with the WAP is not associated with a captive portal. This third data may take the form of a probe request in some instances. For instance, the first data may correspond in whole or in part to the captive-portal data 302 described in FIG. 3. Further, while this example describes the third data including the request for information regarding whether the SSID is associated with a captive portal along with the data for connecting with the WAP, in other instances the third data may include the former information separate from the latter data. Further, the third data indicating that the SSID is not associated with a captive portal may specify the SSID via an SSID hash value or via any other manner. Regardless of the data structure used, it is to be appreciated that the client device 106(1) may advertise (e.g., via a broadcast of a probe request) that the SSID associated with the WAP is not behind a captive portal as part of a reconnection attempt by the client device 106(1). Thus, the peer client devices in the environment may (e.g., passively) learn of that the SSID of the WAP is not associated with a captive portal based on this advertisement. It is also to be appreciated that while this example describes the client device 106(1) advertising this information upon a reconnection attempt, the client device 106(1) and/or any client device storing an indication that an SSID is not associated with a captive portal may advertise this information during any sort of connection attempt with the SSID, another SSID in the environment, and/or at any other time.

At an operation 536, the client device 106(1) establishes a connection with the WAP associated with the SSID. At an operation 538, the client device 106(1) refrains from performing a captive-portal check at least partly in response to reading the notification at the operation 532. In some instances, this may include refraining from sending a request (e.g., an HTTP GET request) to a predefined URL at least partly in response to reading the notification at the operation 532. At an operation 540, the client device 106(1) updates, in the persistent memory of the client device 106(1), the indication that the SSID is not associated with the captive portal. For instance, the client device 106(1) may store the time associated with the latest connection with the SSID in memory. At an operation 542, the client device 106(1) sends notification data to one or more applications executing on the client device 106(1) without first performing a captive-portal check, the notification data indicating that the client device 106(1) has network connectivity.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) may possess its own local memory, which also may store program modules, program data, and/or one or more operating systems. The processors(s) may be located in a single device or system, or across disparate devices or systems, which may be owned or operated by various entities.

The computer-readable media described herein may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A first electronic device comprising:

one or more processors; and one or more computer-readable media storing computer-executable instructions that, when executed, cause the one or more processors to perform acts comprising:

outputting first data associated with connecting to a wireless access point (WAP) in an environment, the WAP associated with a service set identifier (SSID) and the first data requesting information regarding whether the SSID is associated with a captive portal, wherein the first data includes an identification of the SSID;

receiving, from a second electronic device in the environment, second data indicating that the SSID is not associated with the captive portal, wherein the second electronic device is a peer client device located in a same local environment as the first electronic device and the WAP; and establishing a connection with the WAP associated with the SSID.

2. The first electronic device as recited in claim 1, wherein the one or more computer-readable media further store computer-executable instructions that, when executed, cause the one or more processors to perform an act comprising refraining from sending a request to a predefined uniform resource locator (URL) at least partly in response to receiving the second data, the predefined URL stored in memory of the first electronic device.

3. The first electronic device as recited in claim 1, wherein the one or more computer-readable media further store computer-executable instructions that, when executed, cause the one or more processors to perform an act comprising sending notification data to one or more applications executing on the first electronic device without first performing a captive-portal check, the notification data indicating that the first electronic device has network connectivity.

4. The first electronic device as recited in claim 1, wherein the one or more computer-readable media further store computer-executable instructions that, when executed, cause the one or more processors to perform acts comprising:

storing, in persistent memory of the first electronic device, an indication that the SSID is not associated with the captive portal;

disconnecting from the WAP;

reading, from the persistent memory upon reconnecting with the WAP, the indication; and refraining from performing a captive-portal check at least partly based on the indication.

5. The first electronic device as recited in claim 1, wherein the one or more computer-readable media further store computer-executable instructions that, when executed, cause the one or more processors to perform acts comprising:

storing, in persistent memory of the first electronic device, an indication that the SSID is not associated with the captive portal;

disconnecting from the WAP;

reading the indication from the persistent memory; and outputting third data associated with reconnecting to the WAP, the third data indicating that the SSID associated with the WAP is not associated with the captive portal.

6. The first electronic device as recited in claim 1, wherein the one or more computer-readable media further store computer-executable instructions that, when executed, cause the one or more processors to perform acts comprising:

receiving, from a third electronic device in the environment, third data requesting information regarding whether the SSID is associated with the captive portal;

generating fourth data indicating that the SSID is not associated with the captive portal; and outputting the fourth data.

7. The first electronic device as recited in claim 1, wherein the one or more computer-readable media further store computer-executable instructions that, when executed, cause the one or more processors to perform acts comprising:

receiving, from a third electronic device in the environment, third data requesting information regarding whether the SSID is associated with the captive portal;

determining that the second electronic device has responded to the third data; and refraining from at least one of: (i) generating fourth data indicating that the SSID is not associated with the captive portal, or (ii) outputting the fourth data.

8. A method implemented at least in part by a first electronic device, the method comprising:

outputting first data associated with connecting to a wireless access point (WAP) in an environment, the WAP associated with a service set identifier (SSID) and the first data requesting information regarding whether the SSID is associated with a captive portal, wherein the first data includes an identification of the SSID;

receiving, from a second electronic device in the environment, second data indicating that the SSID is not associated with the captive portal, wherein the second electronic device is a peer client device located in a same local environment as the first electronic device and the WAP; and establishing a connection with the WAP associated with the SSID.

9. The method as recited in claim 8, further comprising refraining, at least partly in response to receiving the second data, from performing a captive-portal check.

10. The method as recited in claim 8, further comprising sending notification data to one or more applications executing on the first electronic device without first performing a captive-portal check, the notification data indicating that the first electronic device has network connectivity.

11. The method as recited in claim 8, further comprising:
storing, in persistent memory of the first electronic device, an indication that the SSID is not associated with the captive portal;
disconnecting from the WAP;
reading, from the persistent memory upon reconnecting with the WAP, the indication; and
refraining from performing a captive-portal check based on the indication.

12. The method as recited in claim 8, further comprising:
storing, in persistent memory of the first electronic device, an indication that the SSID is not associated with the captive portal;
disconnecting from the WAP;
reading the indication from the persistent memory; and
outputting third data associated with reconnecting to the WAP, the third data indicating that the SSID associated with the WAP is not associated with the captive portal.

13. The method as recited in claim 8, further comprising:
receiving, from a third electronic device in the environment, third data requesting information regarding whether the SSID is associated with the captive portal;
generating fourth data indicating that the SSID is not associated with the captive portal; and
outputting the fourth data.

14. The method as recited in claim 8, further comprising:
receiving, from a third electronic device in the environment, third data requesting information regarding whether the SSID is associated with the captive portal;
determining that the second electronic device has responded to the third data; and
refraining from at least one of: (i) generating fourth data indicating that the SSID is not associated with the captive portal, or (ii) outputting the fourth data.

15. A first electronic device comprising:
one or more processors; and
one or more computer-readable media storing computer-executable instructions that, when executed, cause the one or more processors to perform acts comprising:
receiving, from a second electronic device in an environment of the first electronic device, first data requesting information regarding whether a service set identifier (SSID) of a wireless access point (WAP) in the environment is associated with a captive portal, wherein the first data includes an identification of the SSID, and wherein the second electronic device is a peer client device located in a same local environment as the first electronic device and the WAP;
determining that the SSID is not associated with the captive portal; and
outputting second data indicating that the SSID is not associated with the captive portal.

16. The first electronic device as recited in claim 15, wherein the one or more computer-readable media further store computer-executable instructions that, when executed, cause the one or more processors to perform acts comprising:
receiving, from a third electronic device in the environment, third data associated with connecting to the WAP and requesting information regarding whether the SSID is associated with the captive portal;
determining that the second electronic device has responded to the third data; and
refraining from at least one of: (i) generating fourth data indicating that the SSID is not associated with the captive portal, or (ii) outputting the fourth data.

17. The first electronic device as recited in claim 15, wherein the one or more computer-readable media further store computer-executable instructions that, when executed, cause the one or more processors to perform acts comprising:
outputting third data associated with connecting to the WAP and requesting information regarding whether the SSID is associated with the captive portal;
receiving, from a third electronic device in the environment, fourth data indicating that the SSID is not associated with the captive portal; and
establishing a connection with the WAP associated with the SSID.

18. The first electronic device as recited in claim 17, wherein the one or more computer-readable media further store computer-executable instructions that, when executed, cause the one or more processors to perform an act comprising refraining, at least partly in response to receiving the fourth data, from performing a captive-portal check.

19. The first electronic device as recited in claim 17, wherein
the one or more computer-readable media further store computer-executable instructions that, when executed, cause the one or more processors to perform an act comprising refraining from sending a request to a predefined uniform resource locator (URL) at least partly in response to receiving the fourth data, the predefined URL stored in memory of the first electronic device.

20. The first electronic device as recited in claim 17, wherein the one or more computer-readable media further store computer-executable instructions that, when executed, cause the one or more processors to perform an act comprising sending notification data to one or more applications executing on the first electronic device without first performing a captive-portal check, the notification data indicating that the first electronic device has network connectivity.

* * * * *